(12) United States Patent
Oie (10) Patent No.: US 12,542,294 B2
(45) Date of Patent: Feb. 3, 2026

(54) ELECTROLYTE SHEET FOR SOLID OXIDE FUEL CELL, METHOD FOR PRODUCING ELECTROLYTE SHEET FOR SOLID OXIDE FUEL CELL, AND CELL UNIT FOR SOLID OXIDE FUEL CELL

(71) Applicant: Murata Manufacturing Co., Ltd., Nagaokakyo (JP)

(72) Inventor: Hirofumi Oie, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 970 days.

(21) Appl. No.: 17/582,132

(22) Filed: Jan. 24, 2022

(65) Prior Publication Data

US 2022/0149410 A1 May 12, 2022

Related U.S. Application Data

(63) Continuation of application No. PCT/JP2020/028993, filed on Jul. 29, 2020.

(30) Foreign Application Priority Data

Jul. 29, 2019 (JP) .................................. 2019-138878

(51) Int. Cl.
*H01M 8/1246* (2016.01)
*H01M 8/12* (2016.01)

(52) U.S. Cl.
CPC .. *H01M 8/1246* (2013.01); *H01M 2008/1293* (2013.01); *H01M 2300/0074* (2013.01)

(58) Field of Classification Search
CPC . H01M 2300/0074; H01M 2008/1293; H01M 8/1296
See application file for complete search history.

(56) References Cited

U.S. PATENT DOCUMENTS

2006/0166053 A1* 7/2006 Badding ............. H01M 8/0271
429/429
2009/0081512 A1 3/2009 Blanchard et al.
2012/0021304 A1* 1/2012 Satake .................. C04B 35/486
429/491
(Continued)

FOREIGN PATENT DOCUMENTS

CN 101536235 A 9/2009
JP H01128361 A 5/1989
JP 2008010240 A 1/2008
(Continued)

OTHER PUBLICATIONS

JP-2016126883-Abstract (Year: 2016).*
(Continued)

*Primary Examiner* — Alexander Usyatinsky
(74) *Attorney, Agent, or Firm* — ArentFox Schiff LLP (57) ABSTRACT

An electrolyte sheet for solid oxide fuel cells that includes a ceramic plate body having a thickness of 200 μm or less, and defining at least one through hole penetrating the ceramic plate body in a thickness direction thereof, and wherein with a minimum value and a maximum value among radii of the at least one through hole being defined as R min and R max, respectively, the at least one through hole has a ratio R min/R max of 0.99 to 1.00 in a plan view from the thickness direction.

9 Claims, 7 Drawing Sheets (56) References Cited

U.S. PATENT DOCUMENTS

2016/0133952 A1\* 5/2016 Takeyama ........... H01M 8/0276
429/514
2016/0285122 A1\* 9/2016 El Batawi ........... H01M 4/8828

FOREIGN PATENT DOCUMENTS

| JP | 2010517208 A | | 5/2010 | |
|---|---|---|---|---|
| JP | 2016126883 A | \* | 7/2016 | |
| JP | 2018199256 A | | 12/2018 | |
| WO | WO-2008054774 A2 | \* | 5/2008 | ............. B23K 26/40 |

OTHER PUBLICATIONS

Decision of JPO to grant a Patent for Application JP 2021535376 (Year: 2023).\*
The decision of SIPO to grant a Patent for Application CN 202080052970 (Year: 2024).\*
Written Opinion of the International Searching Authority issued for PCT/JP2020/028993, date of mailing Oct. 20, 2020.
International Search Report issued for PCT/JP2020/028993, date of mailing Oct. 20, 2020.

\* cited by examiner

ELECTROLYTE SHEET FOR SOLID OXIDE FUEL CELL, METHOD FOR PRODUCING ELECTROLYTE SHEET FOR SOLID OXIDE FUEL CELL, AND CELL UNIT FOR SOLID OXIDE FUEL CELL

CROSS REFERENCE TO RELATED APPLICATIONS

The present application is a continuation of International application No. PCT/JP2020/028993, filed Jul. 29, 2020, which claims priority to Japanese Patent Application No. 2019-138878, filed Jul. 29, 2019, the entire contents of each of which are incorporated herein by reference.

FIELD OF THE INVENTION

The present invention relates to an electrolyte sheet for solid oxide fuel cells, a method of producing an electrolyte sheet for solid oxide fuel cells, and a unit cell for solid oxide fuel cells.

BACKGROUND OF THE INVENTION

A solid oxide fuel cell (SOFC) is a device that produces electric energy through reactions of $H_2+O^{2-}\to H_2O+2e^-$ at the fuel electrode and $(\frac{1}{2})O_2+2e^-\to O^{2-}$ at the air electrode. An SOFC is typically a stack of unit cells each including an electrolyte sheet made of a zirconia-based ceramic plate body and a fuel electrode and an air electrode that are formed on the electrolyte sheet.

Some electrolyte sheets for SOFCs are provided with a through hole penetrating the sheet in a thickness direction as a gas flow path.

For example, Patent Literature 1 discloses a method of producing a ceramic plate body to be used as an electrolyte sheet for SOFCs. The production method disclosed in Patent Literature 1 includes forming a through hole with a drill in an unsintered laminate obtained by stacking unsintered plate bodies and resin sheets or layers alternately and compression-bonding the stack.

Patent Literature 1: JP 2018-199256 A

SUMMARY OF INVENTION

Such a through hole formed in an electrolyte sheet, depending on its shape and the roughness of its side surface, may change the flow rate and stagnation state of a gas, thereby decreasing the power generation efficiency of a fuel cell with the electrolyte sheet or the strength of the electrolyte sheet. The processing accuracies such as dimensional accuracy and positional accuracy of a through hole are significant factors in an electrolyte sheet.

However, an unsintered plate body, which will be shrunk by firing, may cause the through hole to change in shape between before and after the firing. An unsintered plate body is therefore difficult to process to form a through hole with the desired dimensions and shape after firing.

A yet another option is adjusting the dimensions and shape of a through hole in a fired electrolyte sheet by processing with a tool such as a die grinder or a drill. However, such a thin electrolyte sheet made of a ceramic plate body easily breaks when processed, and thus would be difficult to process to form a through hole with the desired dimensions and shape.

The present invention was made to solve the above problem, and aims to provide an electrolyte sheet for SOFCs which has high strength even though being provided with a through hole. The present invention also aims to provide a method of producing the electrolyte sheet and a unit cell for SOFCs which includes the electrolyte sheet.

The electrolyte sheet for SOFCs of the present invention includes a ceramic plate body having a thickness of 200 μm or less, and defining at least one through hole penetrating the ceramic plate body in a thickness direction thereof, and wherein with a minimum value and a maximum value among radii of the at least one through hole being defined as R min and R max, respectively, the at least one through hole has a ratio R min/R max of 0.99 to 1.00 in a plan view from the thickness direction.

The method of producing an electrolyte sheet for SOFCs of the present invention includes: producing an unsintered body by pressing together an unsintered plate body containing a ceramic material powder and a resin layer containing a resin powder, the unsintered plate body including ceramic green sheets stacked with a casting direction of at least one ceramic green sheet being perpendicular to the casting direction of an adjacent ceramic green sheet; forming at least one unsintered body through hole that penetrates the unsintered body in a stacking direction of the ceramic green sheets; cutting a side surface of the at least one unsintered body through hole; and firing the unsintered body to burn off the resin layer and sinter the unsintered plate body into a ceramic plate body having at least one ceramic plate body through hole.

The unit cell for SOFCs of the present invention includes: a fuel electrode; an air electrode; and the electrolyte sheet of the present invention between the fuel electrode and the air electrode.

The present invention can provide an electrolyte sheet for SOFCs which has high strength even though being provided with a through hole.

DETAILED DESCRIPTION OF THE PREFERRED EMBODIMENTS

The electrolyte sheet for SOFCs of the present invention, the method of producing an electrolyte sheet for SOFCs of the present invention, and a unit cell for SOFCs of the present invention are described below.

The present invention is not limited to the following preferred embodiments, and may be suitably modified without departing from the gist of the present invention. Combinations of two or more preferred features described in the following preferred features are also within the scope of the present invention.

The drawings are schematic drawings, and the dimensions, the aspect ratio, the scale, and other parameters may differ from those of the actual products.

Electrolyte Sheet for SOFCs

Figure 1:
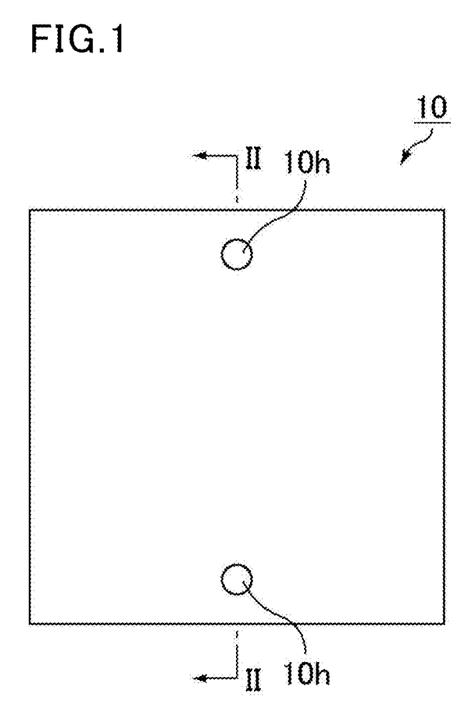
FIG. 1 is a schematic plan view of an example of an electrolyte sheet for SOFCs of the present invention.
Figure 2:
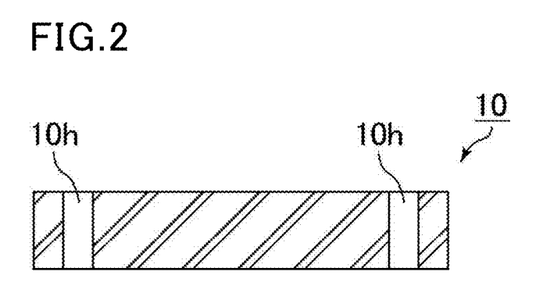
FIG. 2 is a cross-sectional view taken along line II-II of the electrolyte sheet in FIG. 1.

FIG. 1 is a schematic plan view of an example of the electrolyte sheet for SOFCs of the present invention. FIG. 2 is a cross-sectional view taken along line II-II of the electrolyte sheet in FIG. 1.

An electrolyte sheet 10 for SOFCs shown in FIG. 1 and FIG. 2 is made of a ceramic plate body. The ceramic plate body is, for example, a sintered body of a solid electrolyte such as scandia-stabilized zirconia or yttria-stabilized zirconia.

The planar shape of the electrolyte sheet 10 as viewed from a thickness direction (vertical direction in FIG. 2) is a substantially square shape.

The electrolyte sheet 10 is provided with two through holes 10$h$ penetrating the electrolyte sheet 10 in a thickness direction of the electrolyte sheet 10.

Figure 3A:
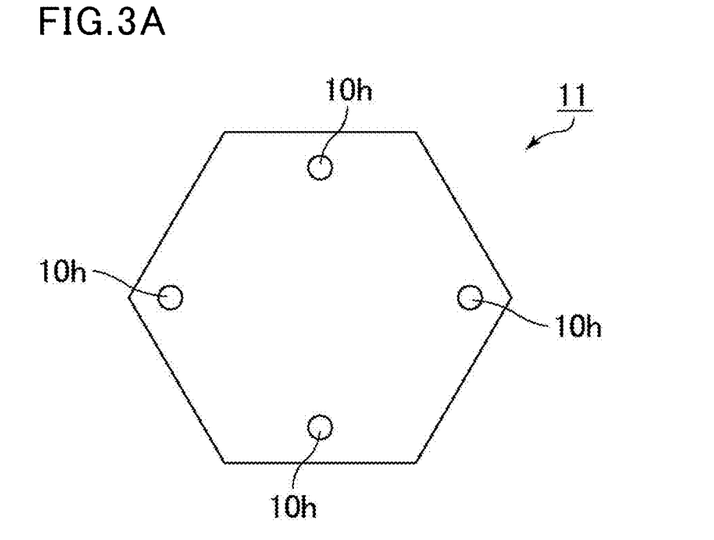
FIG. 3A, FIG. 3B, and FIG. 3C are schematic plan views of other examples of the electrolyte sheet for SOFCs of the present invention.
Figure 3B:
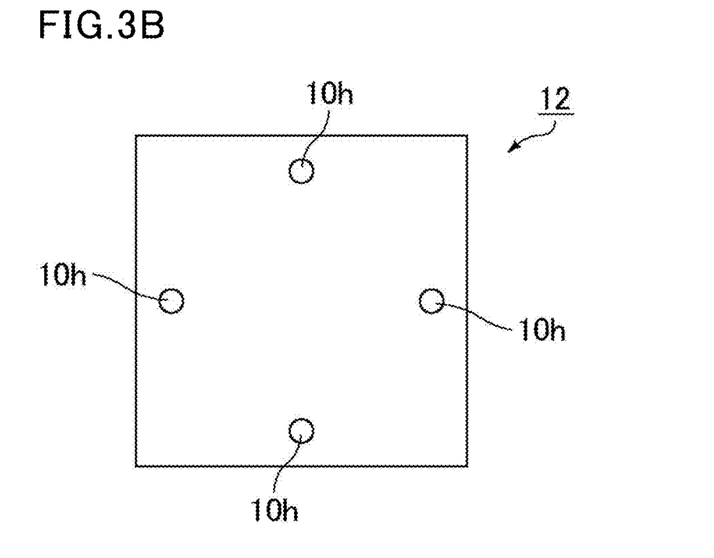
Figure 3C:
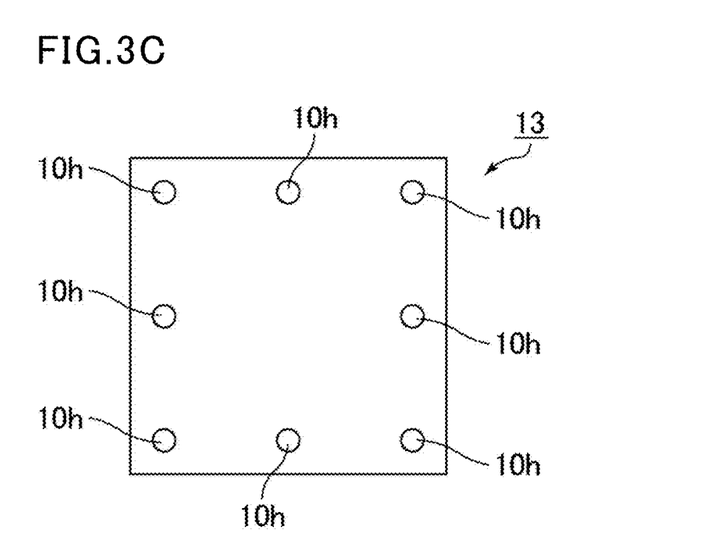

FIG. 3A, FIG. 3B, and FIG. 3C are schematic plan views of other examples of the electrolyte sheet for SOFCs of the present invention.

An electrolyte sheet 11 shown in FIG. 3A has a regular hexagonal planar shape as viewed from a thickness direction of the electrolyte sheet 11 and is provided with four through holes 10$h$ penetrating the electrolyte sheet 11 in the thickness direction of the electrolyte sheet 11.

An electrolyte sheet 12 shown in FIG. 3B has a square planar shape as viewed from a thickness direction of the electrolyte sheet 12 and is provided with four through holes 10$h$ penetrating the electrolyte sheet 12 in a thickness direction of the electrolyte sheet 12.

An electrolyte sheet 13 shown in FIG. 3C has a square planar shape as viewed from a thickness direction of the electrolyte sheet 13 and is provided with eight through holes 10$h$ penetrating the electrolyte sheet 13 in a thickness direction of the electrolyte sheet 13.

The electrolyte sheet for SOFCs of the present invention is provided with at least one through hole penetrating therethrough in the thickness directions as a gas flow path as shown in FIG. 1, FIG. 2, FIG. 3A, FIG. 3B, and FIG. 3C. The number, shape(s), position(s), and the like of the through hole(s) are not limited. Preferably, in a plan view from a thickness direction of the electrolyte sheet, the through holes are provided at positions where the through holes are vertically and/or horizontally symmetrical relative to the center of the electrolyte sheet.

The electrolyte sheet for SOFCs of the present invention has a thickness of 200 μm or less. The electrolyte sheet for SOFCs of the present invention preferably has a thickness of 30 μm or more, more preferably 50 μm or more.

The thickness of an electrolyte sheet means an average thickness calculated from values obtained by measuring the thickness at randomly selected nine sites within a region excluding the portions 5 mm inside the peripheral edges of the sheet with a U-shape Frame Sheet Metal Micrometer (available from Mitutoyo Corporation, PMU-MX).

Preferably, the planar shape of the electrolyte sheet for SOFCs of the present invention as viewed from a thickness direction of the electrolyte sheet is a polygonal shape having 90° rotational symmetry, such as a square shape or a hexagonal shape.

Preferably, the electrolyte sheet for SOFCs of the present invention has at least one rounded corner in a plan view from a thickness direction of the electrolyte sheet. In this case, all corners may be rounded or some corners may be rounded.

In the electrolyte sheet for SOFCs of the present invention, wherein with a minimum value and a maximum value among radii of at least one through hole being defined as R min and R max, respectively, the at least one through hole has a ratio R min/R max of 0.99 to 1.00 in a plan view from the thickness direction.

When the ratio R min/R max is 0.99 to 1.00, the planar shape of the through hole can be a nearly perfect circle. As a result, the electrolyte sheet can have high strength. Also, the gas flow rate during operations of an SOFC with the electrolyte sheet is stabilized, so that an increase in power generation output can be expected.

The method of calculating the ratio R min/R max for the electrolyte sheet 10 in FIG. 1 is described as an example below.

Figure 4:
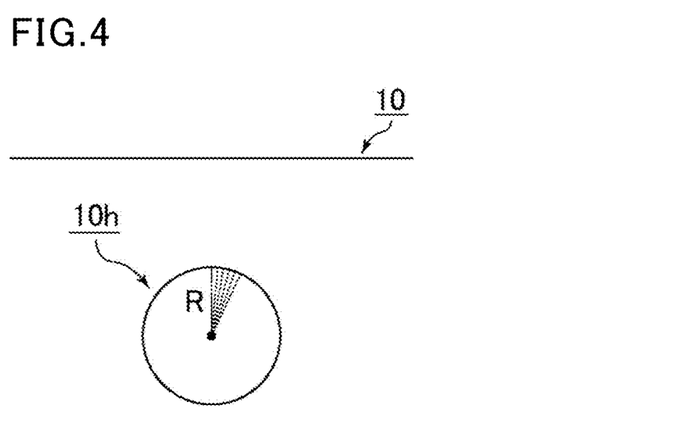
FIG. 4 is a plan view showing a method of calculating the ratio R min/R max of a through hole in the electrolyte sheet in FIG. 1.

FIG. 4 is a plan view showing a method of calculating the ratio R min/R max of a through hole in the electrolyte sheet in FIG. 1.

The radius R of a through hole 10$h$ in the electrolyte sheet 10 is measured at 200 points at equal intervals with a video measuring system (available from Nikon Corporation, NEXIV VMZ-R6555). The minimum value among the radii R is taken as R min and the maximum value among the radii R is taken as R max to calculate the ratio R min/R max. The thus-calculated ratio R min/R max is 0.99 to 1.00.

In the electrolyte sheet for SOFCs of the present invention, preferably, all through holes have a ratio R min/R max of 0.99 to 1.00.

In the electrolyte sheet for SOFCs of the present invention, preferably, a side surface of the at least one through hole has an arithmetic average roughness Sa of 0.2 μm or less. With the flattened side surface of a through hole, the electrolyte sheet can have even higher strength.

The arithmetic average roughness Sa of the side surface of a through hole is measured by dividing an electrolyte sheet into samples having a size with which each sample can be placed in a three-dimensional scanning electron microscope (3D-SEM) (available from Elionix Inc., ERA-8900FE), pre-processing the samples by coating the portions of the samples corresponding to the through holes of electrolyte sheets with Pt, and then measuring the roughness with an acceleration voltage of 5 kV, a working distance (WD) of 15 μm, and an observation magnification of 3000×.

In the electrolyte sheet for SOFCs of the present invention, the side surface of the at least one through hole has an arithmetic average roughness Sa of more preferably 0.15 μm or less, still more preferably 0.1 μm or less. The side surface of the at least one through hole also preferably has an arithmetic average roughness Sa of 0.01 μm or more.

In the electrolyte sheet for SOFCs of the present invention, preferably, the side surfaces of all through holes have an arithmetic average roughness Sa falling within the range above.

The electrolyte sheet for SOFCs of the present invention is preferably produced by the following method.

Method of Producing Electrolyte Sheet for SOFCs

The method of producing an electrolyte sheet for SOFCs of the present invention includes: producing an unsintered body; forming at least one unsintered body through hole; cutting a side surface of the at least one unsintered body through hole; and firing the unsintered body.

These steps are described below.

Producing Unsintered Body

First, an unsintered body is produced by pressing together an unsintered plate body containing a ceramic material powder and a resin layer containing a resin powder.

The unsintered plate body consists of a plurality of ceramic green sheets. Here, the ceramic green sheets are stacked with the casting directions of at least one ceramic green sheet being perpendicular to the casting directions of an adjacent ceramic green sheet.

A ceramic green sheet is suitably produced by tape casting, particularly doctor blading or calendaring.

Figure 5A:
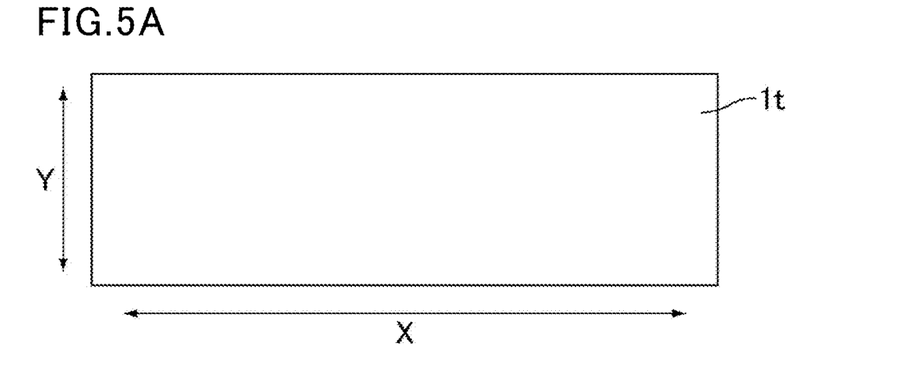
FIG. 5A, FIG. 5B, and FIG. 5C are schematic plan views of an example of producing ceramic green sheets.
Figure 5B:
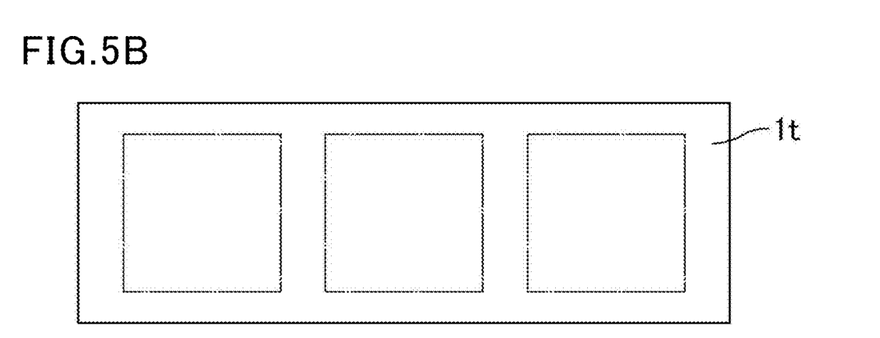
Figure 5C:
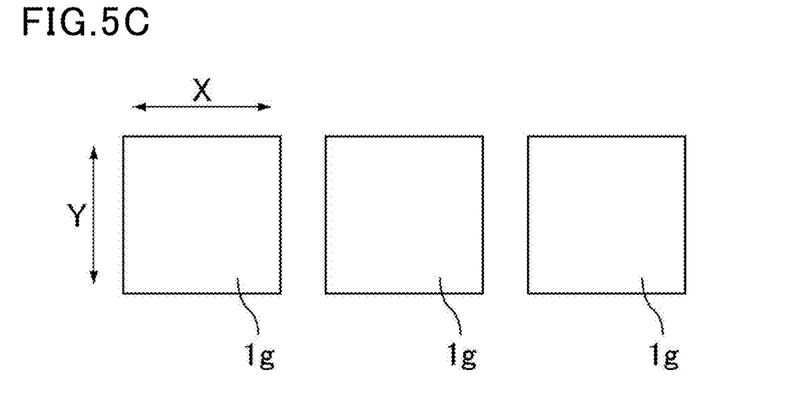

FIG. 5A, FIG. 5B, and FIG. 5C are schematic plan views of an example of producing ceramic green sheets.

As shown in FIG. 5A, a carrier film is coated with a ceramic slurry obtained by mixing a ceramic material powder, a binder, an organic solvent and, as necessary, additive(s) such as a dispersant, so that ceramic green tape $1t$ is obtained. In FIG. 5A, X indicates the casting directions and Y indicates the directions perpendicular to the casting directions. The ceramic material powder is typically a solid electrolyte powder such as scandia-stabilized zirconia powder or yttria-stabilized zirconia powder.

The resulting ceramic green tape $1t$ is punched to obtain pieces having a predetermined size by a known technique as shown in FIG. 5B. The pieces are removed from the carrier film and ceramic green sheets $1g$ are produced as shown in FIG. 5C. Punching of the ceramic green tape and removal of the punched-out pieces from the carrier film may be performed in any order.

Figure 6:
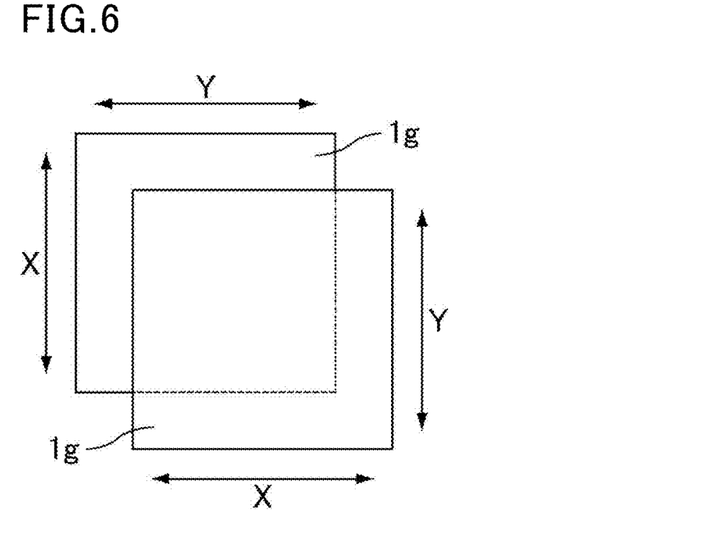
FIG. 6 is a schematic plan view of an example of producing an unsintered plate body.
Figure 7:
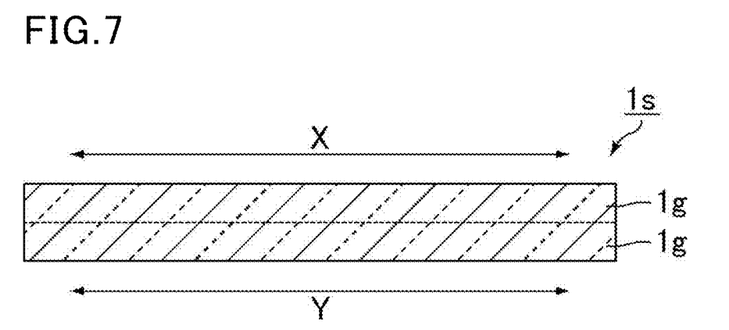
FIG. 7 is a schematic cross-sectional view of the example of producing an unsintered plate body.

FIG. 6 is a schematic plan view of an example of producing an unsintered plate body. FIG. 7 is a schematic cross-sectional view of the example of producing an unsintered plate body.

Although FIG. 6 and FIG. 7 show producing an unsintered plate body $1s$ by stacking two ceramic green sheets $1g$ with the casting directions of one ceramic green sheet $1g$ being perpendicular to the casting directions of an adjacent ceramic green sheet $1g$ and compression-bonding these sheets, any number, but not less than two, of ceramic green sheets $1g$ may be used. The ceramic green sheets $1g$ may not be compression-bonded, and may simply be stacked on one another. When the unsintered plate body $1s$ includes a plurality of ceramic green sheets $1g$, the thickness of a ceramic plate body $10p$ to be obtained is controlled as appropriate in a simple manner.

A ceramic green sheet $1g$ produced by tape casting has shrinkage factors different in the X and Y directions when fired. Thus, when the unsintered plate body $1s$ includes the ceramic green sheets $1g$ stacked with their casting directions being parallel to one another and is provided with a through hole, firing the unsintered plate body $1s$ may distort the unsintered plate body $1s$, deforming the through hole. In contrast, when the unsintered plate body $1s$ includes the ceramic green sheets $1g$ stacked with the casting directions of at least one ceramic green sheet $1g$ being perpendicular to the casting directions of an adjacent ceramic green sheet $1g$ and is provided with a through hole, firing the unsintered plate body $1s$ results in a small difference in shrinkage factor, reducing or preventing deformation of the through hole. As a result, the electrolyte sheet can have high strength. Also, the gas flow rate during operations of an SOFC with the electrolyte sheet is stabilized, so that an increase in power generation output can be expected.

The unsintered body is produced by, for example, pressing together an unsintered plate body and a resin layer on at least a first main surface of the unsintered plate body.

Figure 8:
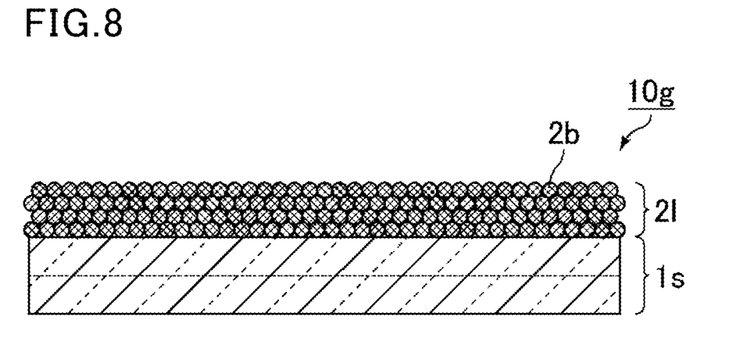
FIG. 8 is a schematic cross-sectional view of an example of producing an unsintered body by pressing together an unsintered plate body and a resin layer formed on a first main surface of the unsintered plate body.

FIG. 8 is a schematic cross-sectional view of an example of producing an unsintered body by pressing together an unsintered plate body and a resin layer formed on a first main surface of the unsintered plate body.

As shown in FIG. 8, a first main surface of the unsintered plate body $1s$ is coated with a resin slurry containing a resin powder $2b$, and thus a resin layer $2l$ is formed on the first main surface of the unsintered plate body $1s$. The unsintered plate body $1s$ and the resin layer $2l$ are then pressed together, whereby an unsintered body $10g$ is produced.

Although FIG. 8 shows formation of the resin layer $2l$ only on the first main surface of the unsintered plate body $1s$, one resin layer $2l$ may be formed on the first main surface of the unsintered plate body $1s$ and another resin layer $2l$ may be formed on a second main surface of the unsintered plate body $1s$.

Figure 9:
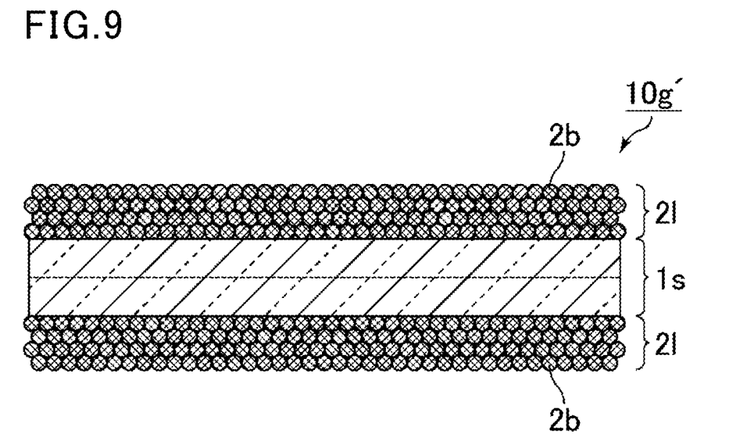
FIG. 9 is a schematic cross-sectional view of another example of producing an unsintered body which is different from the example in FIG. 8.

FIG. 9 is a schematic cross-sectional view of another example of producing an unsintered body which is different from the example in FIG. 8.

As shown in FIG. 9, the resin layers 21 are formed on the first and second main surfaces of the unsintered plate body is by coating the first and second main surfaces of the unsintered plate body $1s$ with a resin slurry containing the resin powder $2b$. The unsintered plate body $1s$ and the resin layers 21 are then pressed together, whereby an unsintered body $10g'$ is produced.

The following steps are described mainly using the unsintered body $10g$ shown in FIG. 8.

The resin slurry is formed by mixing the resin powder $2b$, a binder, an organic solvent and, as necessary, additives such as a dispersant. The resin powder $2b$ is preferably made of a resin material that is poorly soluble in an organic solvent used in production of a resin slurry. The resin powder $2b$ has a spherical shape with a median size of 0.5 µm to 10 µm, for example.

The median size is defined as the particle size at 50% ($D_{50}$) in a cumulative particle size distribution curve of the resin powder $2b$ expressed as cumulative percentage against particle size scale. The particle size distribution of the resin powder $2b$ is measured with, for example, a laser diffraction particle size distribution measuring device. The median size used here is the equivalent spherical diameter because the resin powder $2b$ may have a shape distorted through the production processes.

The expression "poorly soluble in an organic solvent" herein means that when 100 g of an organic solvent and 0.1 g of a resin powder are mixed at room temperature (25° C.) for 24 hours, there remains a visually observable residue. The organic solvent used to prepare a resin slurry is, for example, at least one solvent (alone or in a mixture) selected from toluene, ethanol, isopropanol, butyl acetate, ethyl acetate, terpineol, and water. In this case, the resin powder $2b$ is made of a crosslinked acrylic resin, for example.

Forming Unsintered Body Through Hole

Figure 10A:
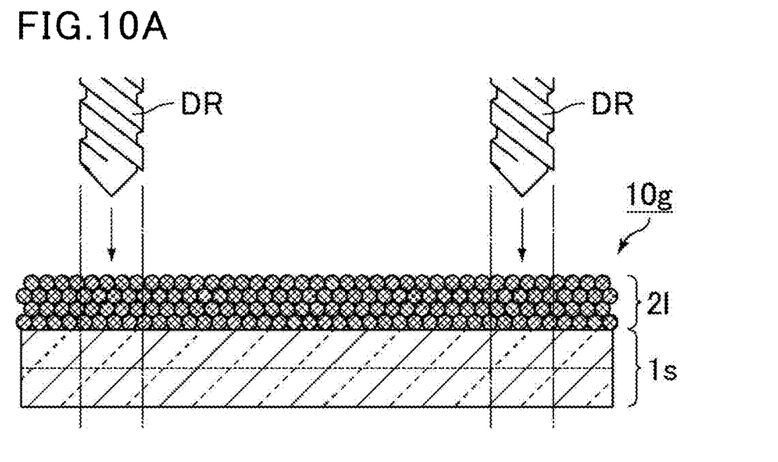
FIG. 10A and FIG. 10B are schematic cross-sectional views of an example of forming unsintered body through holes.
Figure 10B:
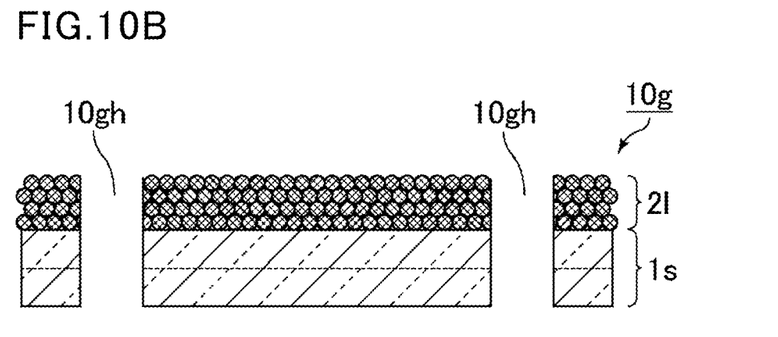

FIG. 10A and FIG. 10B are schematic cross-sectional views of an example of forming unsintered body through holes.

FIG. 10A and FIG. 10B show forming two unsintered body through holes 10gh penetrating the unsintered body 10g in the stacking direction of the ceramic green sheets.

The unsintered body through holes 10gh are preferably formed with at least one drill DR. In this case, the unsintered body 10g is drilled with the at least one drill DR from its first main surface to second main surface or vice versa such that the unsintered body through holes 10gh penetrating the unsintered body 10g in the stacking direction are formed. The drilling may be performed under any conditions.

Cutting Side Surface of Unsintered Body Through Hole

Figure 11:
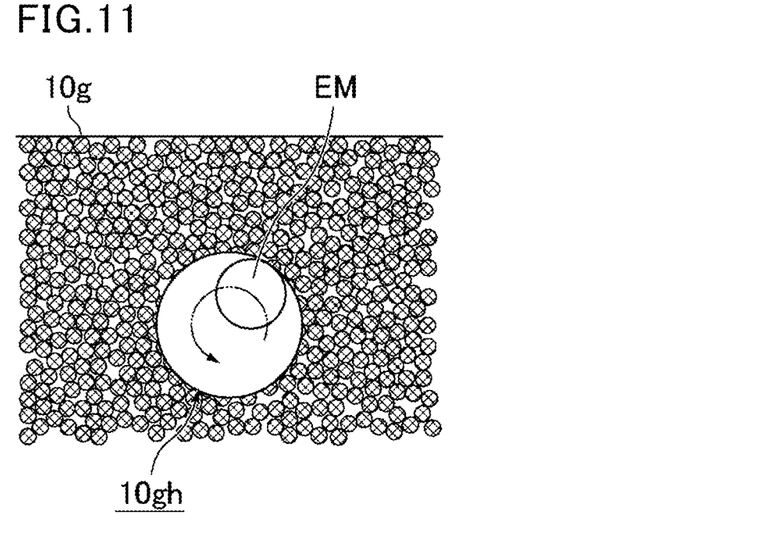
FIG. 11 is a schematic plan view of an example of cutting the side surface of an unsintered body through hole.

FIG. 11 is a schematic plan view of an example of cutting the side surface of an unsintered body through hole.

As shown in FIG. 11, cutting the side surface of the unsintered body through hole 10gh enables adjustment of the shape of the unsintered body through hole 10gh and flattening of the side surface of the unsintered body through hole 10gh.

Preferably, the side surface of the unsintered body through hole 10gh is cut with an end mill EM. The end milling may be performed under any conditions.

Firing Unsintered Body

Figure 12:
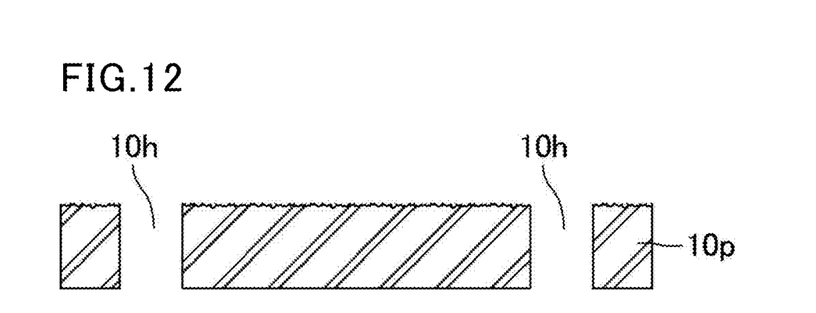
FIG. 12 is a cross-sectional view of an example of firing an unsintered body.

FIG. 12 is a schematic cross-sectional view of an example of firing an unsintered body.

When the unsintered body 10g is fired, the resin layer 21 is burned off. Also, the unsintered plate body 1s is sintered into a ceramic plate body 10p provided with through holes 10h.

When the resin layer 2l is burned off, a first main surface of the ceramic plate body 10p becomes rough with scattered recesses. Meanwhile, when the unsintered body 10g' shown in FIG. 9 is fired, the resin layers 21 formed on the respective first and second main surfaces of the unsintered plate body 1s are burned off, so that both the first main surface and the second main surface of the resulting ceramic plate body become rough with scattered recesses.

Preferably, the firing an unsintered body includes degreasing and sintering.

Unit Cell for SOFCs

Figure 13:
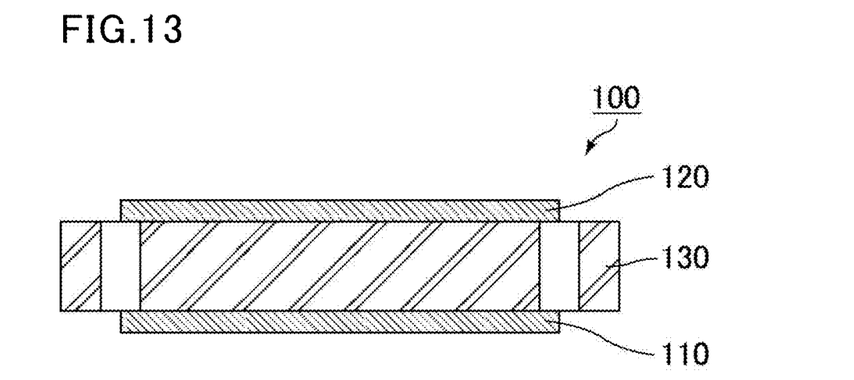
FIG. 13 is a schematic cross-sectional view of an example of a unit cell for SOFCs of the present invention.

FIG. 13 is a schematic cross-sectional view of an example of a unit cell for SOFCs of the present invention.

A unit cell 100 for SOFCs shown in FIG. 13 includes a fuel electrode 110, an air electrode 120, and an electrolyte sheet 130 between the fuel electrode 110 and the air electrode 120. The electrolyte sheet 130 is the electrolyte sheet for SOFCs of the present invention. The fuel electrode 110 and the air electrode 120 may be a known fuel electrode for SOFCs and a known air electrode for SOFCs, respectively.

The unit cell for SOFCs of the present invention includes the electrolyte sheet for SOFCs of the present invention. Since the electrolyte sheet for SOFCs of the present invention has high strength because it is provided with through hole (s) having a nearly perfect circular shape. Also, the gas flow rate during operations of an SOFC with the electrolyte sheet is stabilized, so that an increase in power generation output can be expected.

The unit cell for SOFCs of the present invention can be produced by forming a fuel electrode on a first main surface of the electrolyte sheet for SOFCs of the present invention and forming an air electrode on a second main surface of the electrolyte sheet.

First, powder of the material of a fuel electrode or an air electrode is mixed with a binder, a solvent and, as necessary, additive(s) such as a dispersant to prepare a slurry. A first main surface or a second main surface of an electrolyte sheet is coated with the slurry to a predetermined thickness, followed by drying the coating film. Thus, a green layer for a fuel electrode or an air electrode is formed. The green layer is fired to produce a fuel electrode or an air electrode. The firing conditions such as the firing temperature may be determined as appropriate depending on the material and the like of the fuel electrode or the air electrode.

The fuel electrode and the air electrode may be produced using a material of known fuel electrodes for SOFCs and a material of known air electrodes for SOFCs, respectively. The binder, solvent, and other additives used to produce a slurry for a fuel electrode or an air electrode may be of any type, and may respectively be selected as appropriate from known binders, solvents, and other additives used to produce a fuel electrode for SOFCs or an air electrode for SOFCs.

EXAMPLES

Examples that more specifically disclose the electrolyte sheet for SOFCs of the present invention are described below. The present invention is not limited to these examples.

Examples 1 to 3

Producing Unsintered Body

Scandia-stabilized zirconia powder, a binder, a dispersant, and an organic solvent were compounded at a predetermined ratio. The organic solvent used was a 7:3 mixture by weight of toluene and ethanol. The compounded product was stirred with a medium made of partially stabilized zirconia at 1000 rpm for three hours to form a ceramic slurry.

The ceramic slurry was formed into a sheet on a carrier film made of polyethylene terephthalate by a known technique to give a ceramic green tape as shown in FIG. 5A. The ceramic green tape was punched by a known technique into 150-mm squares as shown in FIG. 5B and removed from the carrier film. Thus, ceramic green sheets as shown in FIG. 5C were produced.

Two ceramic green sheets removed from the carrier film were stacked with the casting directions of one ceramic green sheet being perpendicular to the casting directions of the other ceramic green sheet and compression-bonded to form an unsintered plate body as shown in FIG. 6 and FIG. 7. Table 1 shows this stacking pattern as XY.

A spherical resin powder made of a crosslinked acrylic resin and having a median size of 1 μm, a binder, a dispersant, and an organic solvent were compounded at a predetermined ratio. The organic solvent used was a 7:3 mixture by weight of toluene and ethanol. The compounded product was stirred with a medium made of partially stabilized zirconia at 1000 rpm for three hours to form a resin slurry.

The resin slurry was applied by printing to a first main surface of the unsintered plate body and then dried to form a resin layer on the first main surface of the unsintered plate body as shown in FIG. 8.

The unsintered plate body and the resin layer formed on the first main surface of the unsintered plate body were pressed together, so that an unsintered body as shown in FIG. 8 was produced. The unsintered body was produced at a heating temperature of 60° C. and a pressing force of 1500 kgf/cm².

Forming Unsintered Body Through Hole

As shown in FIG. 10A and FIG. 10B, unsintered body through holes penetrating the unsintered body in the stacking direction were formed with a drill. The drilling was performed at a feed rate of 0.03 mm/revolution and a spindle speed of 3000 revolutions/minute. The two unsintered body through holes had a diameter of 14 mm and were formed at the positions shown in FIG. 1.

Cutting Side Surface of Unsintered Body Through Hole

As shown in FIG. 11, the side surfaces of the unsintered body through holes were cut with an end mill. The end milling was performed at a feed rate of 0.03 mm/revolution and a spindle speed of 3000 revolutions/minute.

Firing Unsintered Body

The unsintered body obtained through the steps above was fired in a furnace into a ceramic plate body as shown in FIG. 12. The resulting ceramic plate body had a thickness of 90 μm and was provided with two through holes.

The firing the unsintered body includes degreasing and sintering. The degreasing was performed by holding the unsintered body at 400° C. for a predetermined time. The sintering was performed by holding the degreased unsintered body at 1400° C. for five hours.

Thus, electrolyte sheets of Examples 1 to 3 were produced.

Example 4

An electrolyte sheet was produced by the same procedure as in Examples 1 to 3, except that the end mill feed rate was changed to 0.01 mm/revolution.

Example 5

An electrolyte sheet was produced by the same procedure as in Examples 1 to 3, except that the end mill feed rate was changed to 0.10 mm/revolution.

Example 6

An electrolyte sheet was produced by the same procedure as in Examples 1 to 3, except that the end mill feed rate was changed to 0.10 mm/revolution and the spindle speed was changed to 1000 revolutions/minute.

Comparative Example 1

An electrolyte sheet was produced by the same procedure as in Examples 1 to 3, except that an unsintered plate body was produced by stacking two ceramic green sheets with the casting directions of one ceramic green sheet being parallel to the casting directions of the other ceramic green sheet, and compression-bonding the stack. Table 1 shows this stacking pattern as XX.

The ratio R min/R max and the arithmetic average roughness Sa of the side surface of each through hole were measured on each of the electrolyte sheets of Examples 1 to 6 and Comparative Example 1 by the methods described above. Table 1 shows the results. Each ratio R min/R max shown in Table 1 is the smaller value between the results of the two through holes. Each arithmetic average roughness Sa of the side surface of a through hole shown in Table 1 is the larger value between the results of the two through holes.

The electrolyte sheets of Examples 1 to 6 and Comparative Example 1 were subjected to a four-point bending test using a precision universal tester (available from Shimadzu Corporation, AGS-X). The target electrolyte sheet was placed on the lower jigs such that the lower jigs were 32.5 mm apart from each other relative to the center of the electrolyte sheet. The upper jigs placed 65 mm apart from each other were lowered from above onto the electrolyte sheet at a rate of 5 mm/min to measure the strength of the electrolyte sheet. An electrolyte sheet was evaluated as excellent when its strength was 200 MPa or more, evaluated as good when its strength was 160 MPa or more and less than 200 MPa, and evaluated as poor when its strength was less than 160 MPa. Table 1 shows the results.

TABLE 1

|  | Electrolyte sheet thickness (μm) | Stacking pattern | End mill feed rate (mm/rev) | End mill spindle speed (rev/min) | Rmin/Rmax | Through hole side surface Sa (μm) | Strength |
| --- | --- | --- | --- | --- | --- | --- | --- |
| Example 1 | 90 | XY | 0.03 | 3000 | 1.000 | 0.05 | Excellent |
| Example 2 | 90 | XY | 0.03 | 3000 | 0.995 | 0.05 | Excellent |
| Example 3 | 90 | XY | 0.03 | 3000 | 0.990 | 0.05 | Excellent |
| Example 4 | 90 | XY | 0.01 | 3000 | 0.995 | 0.10 | Excellent |
| Example 5 | 90 | XY | 0.10 | 3000 | 0.995 | 0.03 | Excellent |
| Example 6 | 90 | XY | 0.10 | 1000 | 0.995 | 7.00 | Good |
| Comparative Example 1 | 90 | XX | 0.03 | 3000 | 0.940 | 1.00 | Poor |

Table 1 shows that the electrolyte sheets in Examples 1 to 6 in which the ratio R min/R max is 0.99 or more and 1.00 or less have higher strength than that in Comparative Example 1 in which the ratio R min/R max is less than 0.99.

In particular, the electrolyte sheets in Examples 1 to 5 in which the arithmetic average roughness Sa of the side surface of a through hole is 0.2 μm or less have even higher strength.

Also, with a ratio R min/R max of 0.99 or more and 1.00 or less as in Examples 1 to 6, the gas flow rate during operations of an SOFC with the electrolyte sheet is stabilized, so that an increase in power generation output can be expected.

REFERENCE SIGNS LIST 1g ceramic green sheet
1s unsintered plate body
1t ceramic green tape
2b resin powder
2l resin layer
10, 11, 12, 13 electrolyte sheet for SOFCs
10g, 10g' unsintered body
10gh unsintered body through hole
10h through hole
10p ceramic plate body
100 unit cell for SOFCs
110 fuel electrode 120 air electrode
130 electrolyte sheet
DR drill
EM end mill
R radius of through hole

The invention claimed is:

1. An electrolyte sheet for solid oxide fuel cells, the electrolyte sheet comprising:
　a ceramic plate body having a thickness of 200 μm or less, the ceramic plate body defining at least one through hole penetrating the ceramic plate body in a thickness direction thereof,
　wherein with a minimum value and a maximum value among radii of the at least one through hole being defined as R min and R max, respectively, the at least one through hole has a ratio R min/R max of 0.99 to 1.00 in a plan view from the thickness direction,
　the ceramic plate body includes main surfaces opposite to each other in the thickness direction, and a side surface of the at least one through hole connects the main surfaces in the thickness direction, and
　at least one of the main surfaces of the ceramic plate body includes scattered recesses,
　wherein the side surface of the at least one through hole has an arithmetic average roughness Sa of 0.2 μm or less.

2. The electrolyte sheet according to claim 1, wherein the arithmetic average roughness Sa is 0.01 μm to 0.2 μm.

3. The electrolyte sheet according to claim 1, wherein the thickness of the ceramic plate body is 30 μm to 200 μm.

4. The electrolyte sheet according to claim 1, wherein the ceramic plate body has a planar shape as viewed from the thickness direction that is a polygonal shape having 90° rotational symmetry.

5. The electrolyte sheet according to claim 1, wherein
　the at least one through hole are a plurality of through holes penetrating the ceramic plate body in the thickness direction thereof, and
　at least a first through hole of the plurality of through holes having the ratio R min/R max of 0.99 to 1.00 in the plan view from the thickness direction.

6. A unit cell for solid oxide fuel cells, the unit cell comprising:
　a fuel electrode;
　an air electrode; and
　the electrolyte sheet according to claim 1 between the fuel electrode and the air electrode.

7. The unit cell according to claim 6, wherein the arithmetic average roughness Sa is 0.01 μm to 0.2 μm.

8. The unit cell according to claim 6, wherein the ceramic plate body has a planar shape as viewed from the thickness direction that is a polygonal shape having 90° rotational symmetry.

9. The electrolyte sheet according to claim 3, wherein the thickness of the ceramic plate body is 50 μm to 200 μm.

* * * * *